(12) United States Patent
Lemay

(10) Patent No.: US 10,795,997 B2
(45) Date of Patent: Oct. 6, 2020

(54) HARDENED SAFE STACK FOR RETURN ORIENTED PROGRAMMING ATTACK MITIGATION

(71) Applicant: INTEL CORPORATION, Santa Clara, CA (US)

(72) Inventor: Michael Lemay, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 396 days.

(21) Appl. No.: 15/629,458

(22) Filed: Jun. 21, 2017

(65) Prior Publication Data

US 2018/0373871 A1 Dec. 27, 2018

(51) Int. Cl.
*G06F 21/56* (2013.01)
*G06F 21/55* (2013.01)
*G06F 21/52* (2013.01)
*G06F 21/54* (2013.01)

(52) U.S. Cl.
CPC ............ *G06F 21/566* (2013.01); *G06F 21/52* (2013.01); *G06F 21/554* (2013.01); *G06F 21/54* (2013.01); *G06F 2221/034* (2013.01)

(58) Field of Classification Search
CPC ...... G06F 21/566; G06F 21/52; G06F 21/554; G06F 21/54; G06F 2221/034
See application file for complete search history.

(56) References Cited

U.S. PATENT DOCUMENTS

| | | | | |
|---|---|---|---|---|
| 5,301,287 A | * | 4/1994 | Herrell ................ | G06F 12/0835 345/501 |
| 5,513,337 A | * | 4/1996 | Gillespie ............ | G06F 12/1441 711/152 |
| 7,856,538 B2 | * | 12/2010 | Speirs, II ........... | G06F 13/4059 711/152 |
| 8,510,596 B1 | * | 8/2013 | Gupta ................... | G06F 11/073 714/15 |

(Continued)

FOREIGN PATENT DOCUMENTS

WO   WO 95/32460   * 11/1995   ............... G06F 3/00

OTHER PUBLICATIONS

Huang et al., "LMP: light-weighted memory protection with hardware assistance," ACSAC2016,Dec. 2016, 11 pages.

(Continued)

*Primary Examiner* — Christopher A Revak

(57) ABSTRACT

Techniques and computing devices for mitigating return-oriented programming (ROP) attacks are described. A hardened stack and an unhardened stack are provided. The hardened stack can include indications of return addresses while the unhardened stack can include all other memory allocations. A stack hardening instruction can be inserted before unhardened instructions (e.g., instructions that are themselves not authorized to access the hardened stack). The stack hardening instruction determines whether the unhardened instruction accessed memory outside the unhardened stack and generates a fault based on the determination. A register can be provided to include an indication of an (Continued)

address span of the unsafe stack. The stack hardening instruction can determine whether the unhardened instruction accessed a memory location outside the address range specified in the register and generate a fault accordingly.

25 Claims, 6 Drawing Sheets

(56) References Cited

U.S. PATENT DOCUMENTS

| | | | | |
|---|---|---|---|---|
| 8,621,337 | B1 * | 12/2013 | Jacob | G06F 11/073 |
| | | | | 714/811 |
| 9,239,801 | B2 * | 1/2016 | Patel | G06F 12/145 |
| 9,934,166 | B2 * | 4/2018 | Wilkerson | G06F 9/322 |
| 2005/0283770 | A1 * | 12/2005 | Karp | G06F 11/3624 |
| | | | | 717/151 |
| 2019/0034664 | A1 * | 1/2019 | Barnes | G06F 21/125 |

OTHER PUBLICATIONS

Szekeres, Laszlo, "Preventing control-flow hijacks with Code Pointer Integrity", IEEE S&P13, retrieved at <http://engineering.nyu.edu/threads/sites/engineering.nyu.edu.threads/files/uploads/code_pointer_integrity.pdf>, (2013), 63 pages.

* cited by examiner

HARDENED SAFE STACK FOR RETURN ORIENTED PROGRAMMING ATTACK MITIGATION

TECHNICAL FIELD

Embodiments described herein generally relate to information processing and, more specifically, but not exclusively, to techniques for memory management and protection.

BACKGROUND

Application programs executing on a computer system may include "bugs" that allow unintentional and even malicious access to regions of memory coupled to the computer system. Such accesses may include reading, writing, or both reading and writing to the memory. To prevent such accesses from corrupting the memory contents or from accessing memory not intended to be accessed, memory protection mechanisms are needed.

BRIEF DESCRIPTION OF THE DRAWINGS

In the drawings, which are not necessarily drawn to scale, like numerals may describe similar components in different views Like numerals having different letter suffixes may represent different instances of similar components. The drawings illustrate generally, by way of example, but not by way of limitation, various embodiments discussed in the present document.

DETAILED DESCRIPTION

Figure 1:
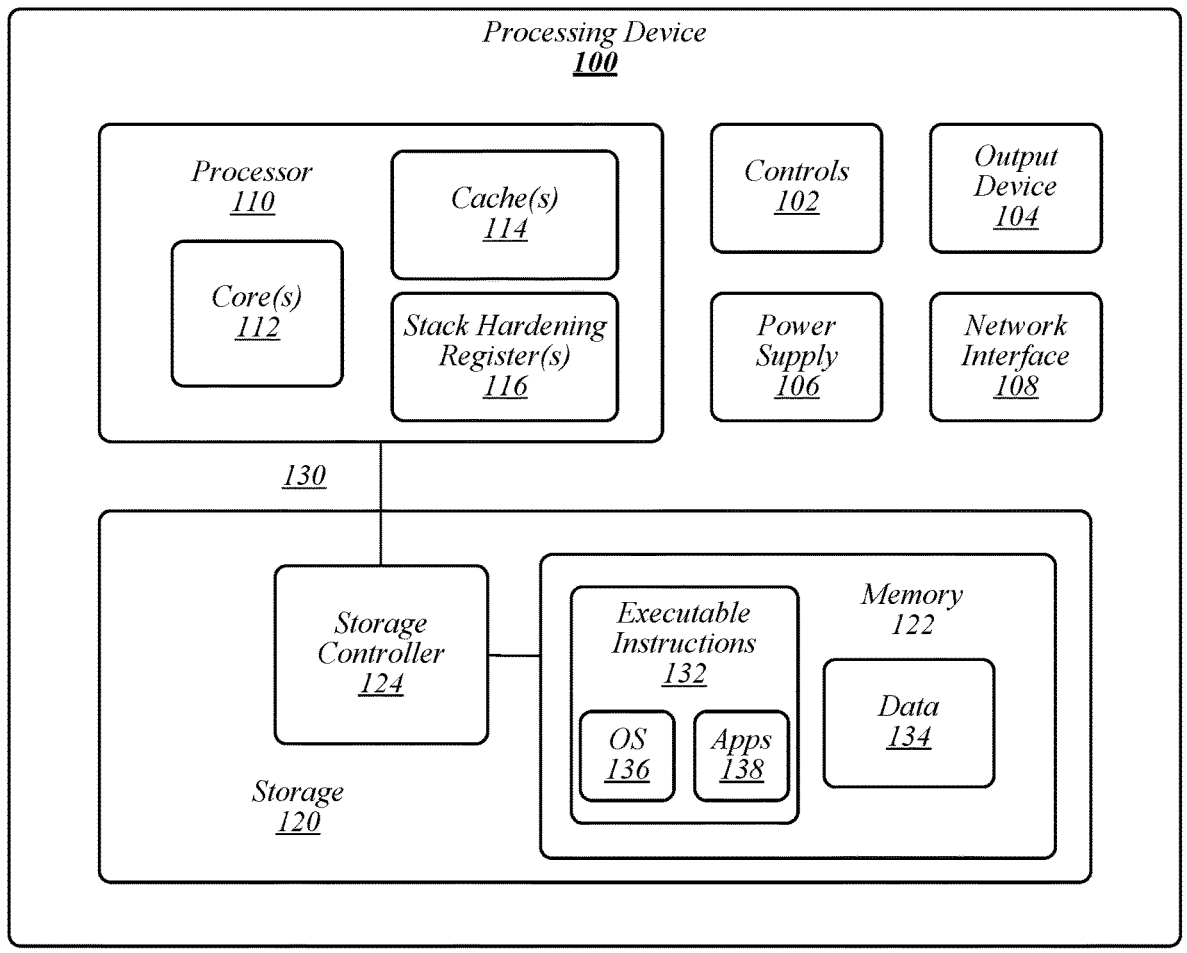
FIG. 1 illustrates a first embodiment of a processing device.

Various embodiments may be generally directed toward systems and techniques for mitigating against return-oriented programming (ROP) attacks. Return-oriented programming (ROP) attacks can be employed to manipulate a call stack. In general, a call stack is a data structure including indications of active threads, instructions, or application sub-routines of a computer program executing on a computer system. ROP attacks take advantage of bugs in the program (e.g., buffer overrun bugs, or the like) that do not sufficiently check memory address bounds before storing user-provided data into memory. Accordingly, in a ROP attack scheme, more input data than the buffer can properly store is provided. When the data is written onto the stack, the excess data may overflow the space allocated to the function's variables and overwrite the function return address. The overwritten function return address is then subsequently used to redirect control to the user-provided address.

The present disclosure provides techniques and systems that may be implemented to mitigate against ROP attacks. In some embodiments, a hardened stack and an unhardened stack are provided. In some embodiments, a hardened stack and an unhardened stack can be provided for each thread. The hardened stack can include indications of return addresses while the unhardened stack can include all other memory allocations. In some examples, the hardened stack can include indications of return addresses and non-return address allocations while the unhardened stack can include other memory allocations. In general, embodiments insert a stack hardening instruction before unhardened instructions (e.g., instructions that are themselves not authorized to access the hardened stack). The stack hardening instruction determines whether the unhardened instruction accessed memory outside the unhardened stack and generates a fault based on the determination. For example, a register can be provided to include an indication of an address span of the unsafe stack and other data outside of the hardened stack region. The stack hardening instruction can determine whether the unhardened instruction may access a memory location outside the address range specified in the register (e.g., due to a buffer overrun bug, an access through a corrupted pointer, or the like) and generate a fault accordingly. It is noted, that a fault can be generated in response to the determination that the unhardened instruction may access a memory location outside the address range specified prior to the memory access taking place. As such, memory access to the hardened stack can be mitigated as described further herein.

Embodiments of the present disclosure provide a number of advantages over prior ROP mitigation techniques. For example, the present disclosure can be implemented to only insert stack hardening instructions before unhardened instructions. The present disclosure can also be implemented to elide stack hardening instructions before unhardened instructions that the compiler determines are safe using static analysis. Furthermore, the present disclosure does not require duplication of the return address. Thus, the present disclosure can be implemented to reduce overhead involved in mitigating against ROP attacks when compared to conventional ROP mitigation techniques.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

FIG. 1 illustrates an example of a processing device 100. In this illustrative example, processing device 100 includes processor 110, storage 120, controls 102, output device 104, power supply 106, and a network interface 108. Processor 110 includes any number of processor core(s) 112, cache(s) 114, and stack hardening register(s) 116. Storage 120 includes memory 122 and storage controller 124. Memory 122 can store instructions executable by the processor 110 (executable instructions) and data 134. Executable instructions 132 can correspond to an execution environment 136 and/or applications (Apps) 138 for device 100.

In general, during operation the processing device 100 can be arranged to execute instructions 132. For example, processor 110 can execute environment 136 to provide an application layer including a hardened and an unhardened stack with which apps 138 can be executed (refer to FIGS. 2-3). In general, the hardened stack can include indications of return addresses while the unhardened stack can include other memory allocations. This is explained in greater detail below.

Processor 110 can deterministically protect the hardened stack by inserting a stack hardening instruction before unhardened instructions. Processor 110 can execute the stack hardening instruction to determine whether the unhardened instruction may access memory outside the unhardened stack and can generate a fault based on the determination. In some examples, processor 110 can add an indication of an address range of the unhardened stack and other data outside of the hardened stack region in stack hardening register 116. Thus, processor 110 can determine whether unhardened instructions accesses memory outside the authorized region including the unhardened stack and other data outside of the hardened stack and generate a fault accordingly. This is explained in greater detail below.

Processor 110 can include any of a variety of processors, such as, for example, commercial central processing units, application specific integrated circuits, or the like including processing core(s) 112 and cache 114. The processing cores 112 can be implemented on the same or different dies. Cache 114 can include any of a variety of memory technologies, such as, for example, volatile memory, non-volatile memory, or a combination of volatile and non-volatile memory. Additionally, stack hardening register 116 can comprise a memory or storage component arranged to store an indication of a memory range corresponding to a region that does not overlap the hardened stack described herein. As a specific example, processor 110 could be an Intel® processor while the stack hardening register could be an Intel® Memory Protection Extensions (MPX) register. However, examples are not limited in this context.

Storage 120 can include memory 122. Memory 122 can be based on any of a wide variety of information storage technologies. For example, memory 122 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

Storage 120 includes storage controller 124. Storage controller 124 can be a processor, such as, an application specific integrated circuit (ASIC) arranged to provide components of processing device 100 access to memory 122. For example, storage controller 124 can provide processor 110 access to memory 122. As an example, storage controller 124 can provide an interface between memory 122 and processor 110 via bus 130. In general, bus 130 can be any of a variety of buses to couple a processor to a memory. For example, bus 130 can be a peripheral component interconnect (PCI) bus, a PCI express (PCIe) bus or the like. Storage controller can thus be configured to operate in accordance with PCI, PCIe, non-volatile memory express (NVMe) or the like standards arranged to communicate via such buses.

Controls 102 can comprise any of a variety of types of manually operable control including and not limited to one or more of a keyboard, mouse, keypad, touchpad, stylus, or the like. The output device may be local or remote and may be connected wirelessly or wired. In various embodiments, the output device 104 may be any of a variety of output devices, such as, for example, a display, a speaker, a haptic feedback device, or the like.

Power supply 106 can comprise components to provide and/or condition power for processing device 100. In some embodiments, power supply 106 can include a power source, such as, a battery, fuel cell, or the like. In some embodiments, power supply 106 can be configured to receive power from an external source and condition and/or convert such power to a format (e.g., voltage magnitude, current, or the like).

Network interface 108 can include a network interface controller (NIC) arranged to couple to an interconnect (e.g., wired, wireless, or the like) to couple the processing device 100 to a network. For example, the network interface 108 can comprise processing circuits arranged to transmit and/or receive information elements via the interconnect to communicate and/or receive information elements (e.g. including data, control signals, or the like) between other devices (not shown) also coupled to the interconnect. In some examples, network interface 108 can be arranged to couple to an interface compliant with any of a variety of standards. In some examples, network interface 108 can be arranged to couple to an Ethernet interconnect.

Figure 2:
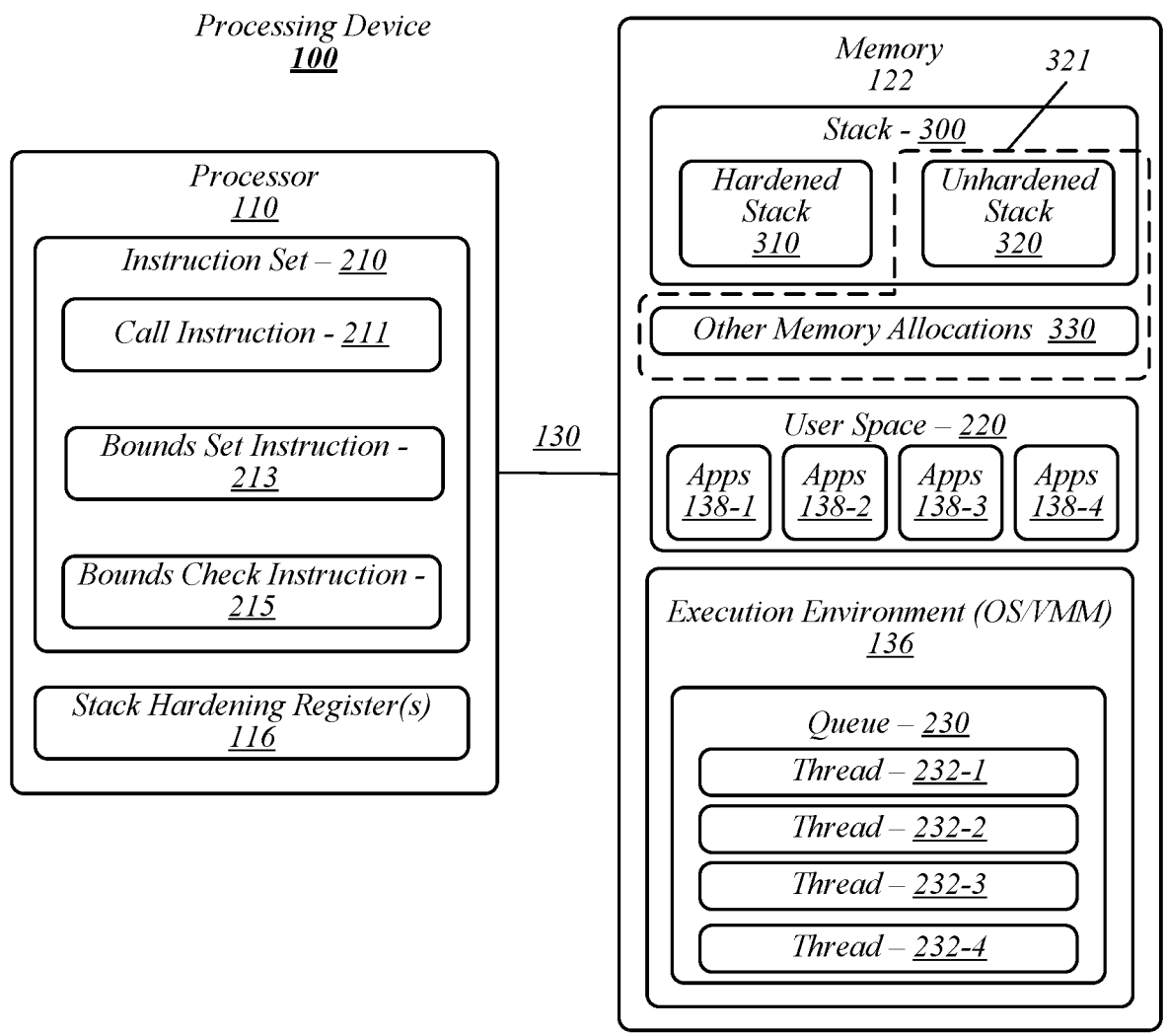
FIG. 2 illustrates a second embodiment of the processing device.

FIG. 2 illustrates a portion of processing device 100 in greater detail. For example, processor 110 and memory 122 are depicted in greater detail. As depicted, processor 110 includes an instruction set 210. In general, instruction set 210 defines the valid instructions that processor 110 can execute. It is to be appreciated, that instruction set 210 can include any of a variety of instructions and can comply with any number of instruction set architectures, such as, for example, the x86 architecture. Furthermore, instructions set 210 can be a 32-bit instruction set, a 64-bit instruction set, or the like. Examples are not limited in this context. Only a select number of instructions are depicted in instruction set 210. Such instructions are given for purposes of clarity of presentation only and not to be limiting.

As depicted, instruction set 210 includes a call instruction 211, a return instruction 213, hardened stack bounds set instruction 213, and a hardened stack bounds check instructions 215. These instructions are described in greater detail below.

As noted, memory 122 can store execution environment 136. In some examples, execution environment 136 can be an operating system (OS), a virtual machine (VM) or a virtual machine manager (VMM) such as, a hypervisor, or the like. Execution of environment 136 can provide a user space 220 in which app(s) 138 execute. In some examples, user space 220 can include several apps 138. For example, user space 220 is depicted with apps 138-1, 138-2, 138-3 and 138-4 operating therein. In general, apps 138-1 to 138-4 can comprise any number of "threads" or instructions with which processor 110 is to execute. During operation, execution environment 136 can provide a queue 230 in which threads 232 corresponding to threads from apps 138-1 to 138-4 are queued for execution by processor 110 (e.g., processor core(s) 112). For example, threads 232-1, 232-2, 232-3 and 232-4 are depicted. In some examples, applications 138-1 to 138-4 can be multi-threaded applications and processor 110 can include multiple cores arranged to processor multiple threads simultaneously. In such an example, execution environment 134 can provide multiple queues 230. Examples are not limited in this context.

Memory may also store a stack 300. The stack 300 is sometimes referred to as the call stack, data stack, or merely, stack. In general, the stack 300 is a data structure that is operative to store both data and control indications (refer to FIG. 3). Stack 300 provides a hardened stack 310 and an unhardened stack 320. It is important to note, that memory 122 can include other memory allocations 330. Other memory allocations 330 can include for example, a heap, global variable spaces, or the like. The other memory allocations 330 can be included along with the unhardened stack 320 within an overall unhardened region 321 of the memory 122. In some examples, stack 300 can provide a hardened stack 310 and an unhardened stack 320 for each thread 232 in queue 230. It is noted, that a single set of hardened and unhardened stacks 310 and 320 are depicted for purposes of clarity. This is however, not to be limiting.

Figure 3:
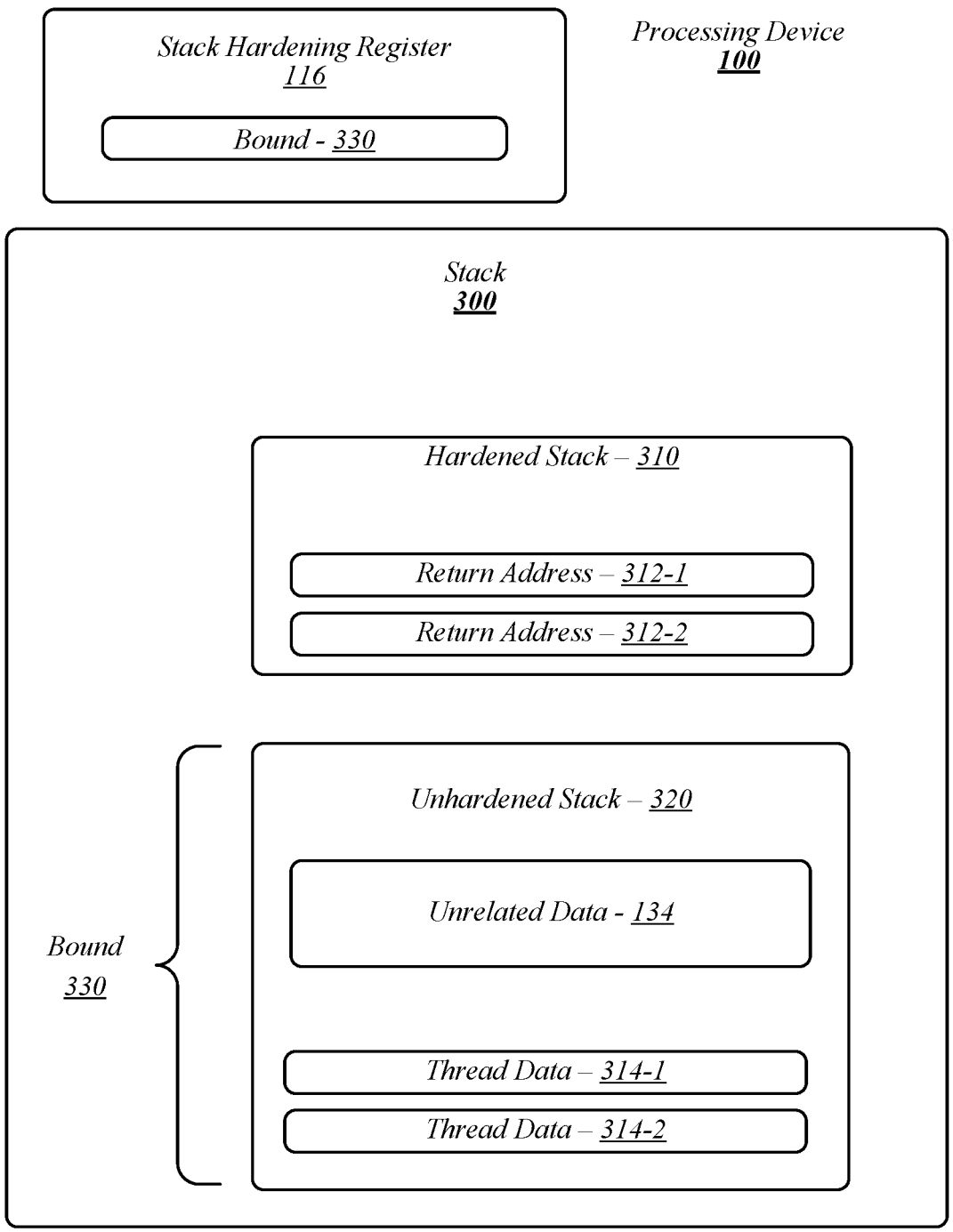
FIG. 3 illustrates a third embodiment of the processing device.

Turning to FIG. 3, during operation, apps 138-1 to 138-4, or more appropriately, threads 232-1 to 232-4 of apps push onto the stack 300. That is, threads 138-1 to 138-4 push thread data (e.g., portions of data 134 onto the stack) and indications of control onto the stack 300. Such indications of control partially determine program control flow and comprise indications of return addresses where the address points to or corresponds to a location in memory 122. Such return addresses may include one or more return addresses for one or more previously performed procedure calls. These return addresses may represent instruction addresses where the called procedure is to return control flow to when the called procedure finishes. For example, processor 110 can receive call instruction 210 (e.g., from apps 138-1 to 138-4, from threads 232-1 to 232-4, or the like). In some embodiments, the call instruction 211 may explicitly specify (e.g., through one or more fields or a set of bits), or otherwise indicate (e.g., implicitly indicate), an address corresponding to a function to be executed. A return address may be added to the stack to indicate where to return control of the program after execution of the called function. Without limitation, commonly the return address may be the address of the next instruction in the program following the call instruction. As one example, the instruction may have a destination operand specification field to specify a register or other storage location where the return address is to be stored. In some examples, the instruction implicitly indicates the stack as the destination for the return address. The processor 110 can place an indication of this return address on the hardened stack 310. For example, as depicted, hardened stack 310 includes indications of return addresses 312-1 and 312-2. It is to be appreciated that stacks can include several control flow indications (e.g., including return addresses). However, the number of return addresses depicted herein is selected for purposes of clarity and not limitation.

Furthermore, during operation, processor 110 can receive other instructions from instructions set 210 that manipulate and/or push thread data 314-1 to 314-2 onto stack 300. As depicted, processor 110 can place such thread data 314-1 to 314-2 onto the unhardened stack 320. As discussed above, in a (ROP) attack, overwriting return addresses 312-1, 312-2, or the like (e.g., using a buffer overflow bug, or the like) to gain control of the executing program is attempted. Conventional stacks are vulnerable to such ROP attacks as such conventional stacks generally store both data 314 and return addresses 312 together on the same stack.

One ROP mitigation strategy is to provide a secondary stack, or a shadow stack. The shadow stack duplicates all calls and returns. During operation, each return address in the non-shadow stack is compared to the return address in the shadow stack prior to return and a fault can be generated if the addresses differ. However, as the number of calls and returns increase, the amount of duplication and the operations to compare the return addresses with the duplicated return addresses are a drag on efficiency of execution. Furthermore, shadow stacks do not protect return addresses from corruption but allow ROP attacks and then fault if such attacks are detected.

The present disclosure provides hardened stack 310 and unhardened stack 320. The unhardened stack is defined by a bound 330, or a range of memory addresses referred to herein as a bound or an unhardened stack bound. In some examples, the bound 330 can start at 0 and end below the hardened stack 310 or all the hardened stacks 310 for each thread 232. During operation, processor 110 periodically executes bounds set instruction 213 and bounds check instructions 215. This is described in greater detail below. However, in general, processor 110 can receive bounds set instruction to set bounds 330. For example, processor 110 can execute bounds set instruction 213 to store an indication of bounds 330 in stack hardening register 116. Additionally, processor 110 can execute bounds check instruction 215 to determine whether an instruction accessed a memory address higher than the bound 330 (or higher than the indicated bound in the stack hardening register). The processor 110 can generate a fault based on a determination that an instruction would access memory outside the bounds 330 (e.g., higher than the bound address, or the like).

In some examples, the bounds check instruction 215 could check for accesses below a lower bound, or accesses outside of multiple discontiguous memory ranges that collectively comprise the unhardened memory region 321. For example, a single bounds check instruction 215 may check that a specified address falls within one of several ranges specified by a corresponding number of stack hardening registers 116. Alternatively, multiple bounds check instructions 215 (e.g., one per stack hardening register, or the like) may each check that specified addresses fall entirely within the range specified by the corresponding stack hardening registers 116. Inversely, one or more stack hardening registers 116 may specify the bounds of hardened stacks, and bounds check instructions 215 may check that specified addresses fall entirely outside of these ranges. Again, one or multiple bounds check instructions 215 may be used to perform such checks. Separate bounds check instructions may 215 be used to check a specified address against each of the lower and upper bounds in one or more stack hardening registers 116, or a single, combined bounds check instruction 215 may check specified addresses against both lower and upper bounds.

It is noted, in some examples, each set of memory accesses being checked covers a range of addresses at least one byte in length. In such examples, combined bounds check instructions 215 must specify that entire range of addresses to be checked. For example, some memory operand address specifications compute an address using a base register and a computed offset from the base register. Thus, the contents of the base register could be used to specify the lowest address to be checked, and the contents of the base register plus the computed offset could be used to specify the highest address to be checked.

It is noted, with some examples, bounds check instruction 215 can be configured to check effective addresses, linear addresses, or both effective and linear addresses. For example, it is to be appreciated, memory (e.g., memory 122, or the like) can be organized and referenced using a variety of different addressing techniques. In general, physical addresses can include an indication of the physical location of the memory region specified by the address. Physical addresses can be referenced using memory pages, or other known techniques. Said differently, physical addresses can be referred to as real addresses, or binary addresses, that may be represented in the form of a binary number on the address bus circuitry to enable the data bus to access a specified storage cell of memory 122.

Conversely, virtual addresses (typically used by application programs) generally consist of a portion of physical memory mapped from one or more linear address space(s), or set(s) of linear addresses, and one or more effective address space(s), or set(s) of effective addresses, and allocated (e.g., by OS 136) for use by applications (e.g., apps 138) executing on the processing device (e.g., device 100).

Effective addresses are typically translated into linear addresses by a memory segmentation mechanism that combines a base address from a segment register with the effective address, depending upon the memory management implementation. Linear addresses are typically translated into physical addresses by a memory paging mechanism depending upon the memory management implementation. For example, with some applications (e.g., MPX registers, or the like) thread-local storage (e.g., thread data 314) addresses are relative to a non-default segment register (e.g. FS register, or the like). As such, checking that thread-local accesses do not corrupt the hardened stack 310 using conventional techniques is challenging. With the present disclosure, bounds check instructions could derive (e.g., calculate, determine, or the like) the linear address from an effective address to determine a thread-local access does not deviate from the bounds specified in the bounds check register 116. In such an example, the bounds check instruction may further determine a linear address from an effective address as indicated by the instruction operand specifying the effective address to be checked and treat the addresses in the bounds check register as linear addresses, thus comparing the derived linear address from the thread-local access to the specified linear addresses corresponding to the bounds of the hardened stack 310.

Figure 4:
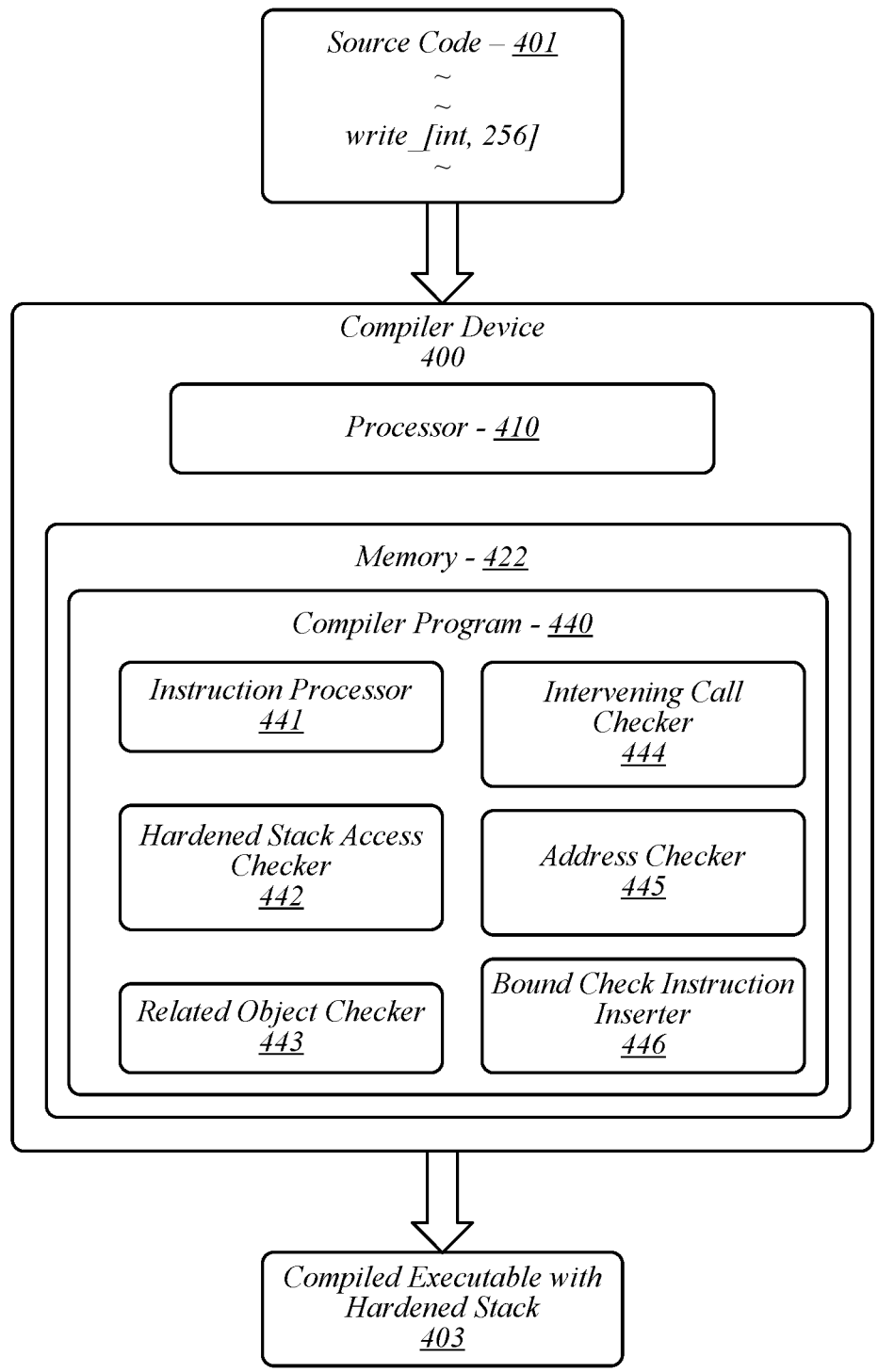
FIG. 4 illustrates an embodiment of a compiler device.
Figure 5:
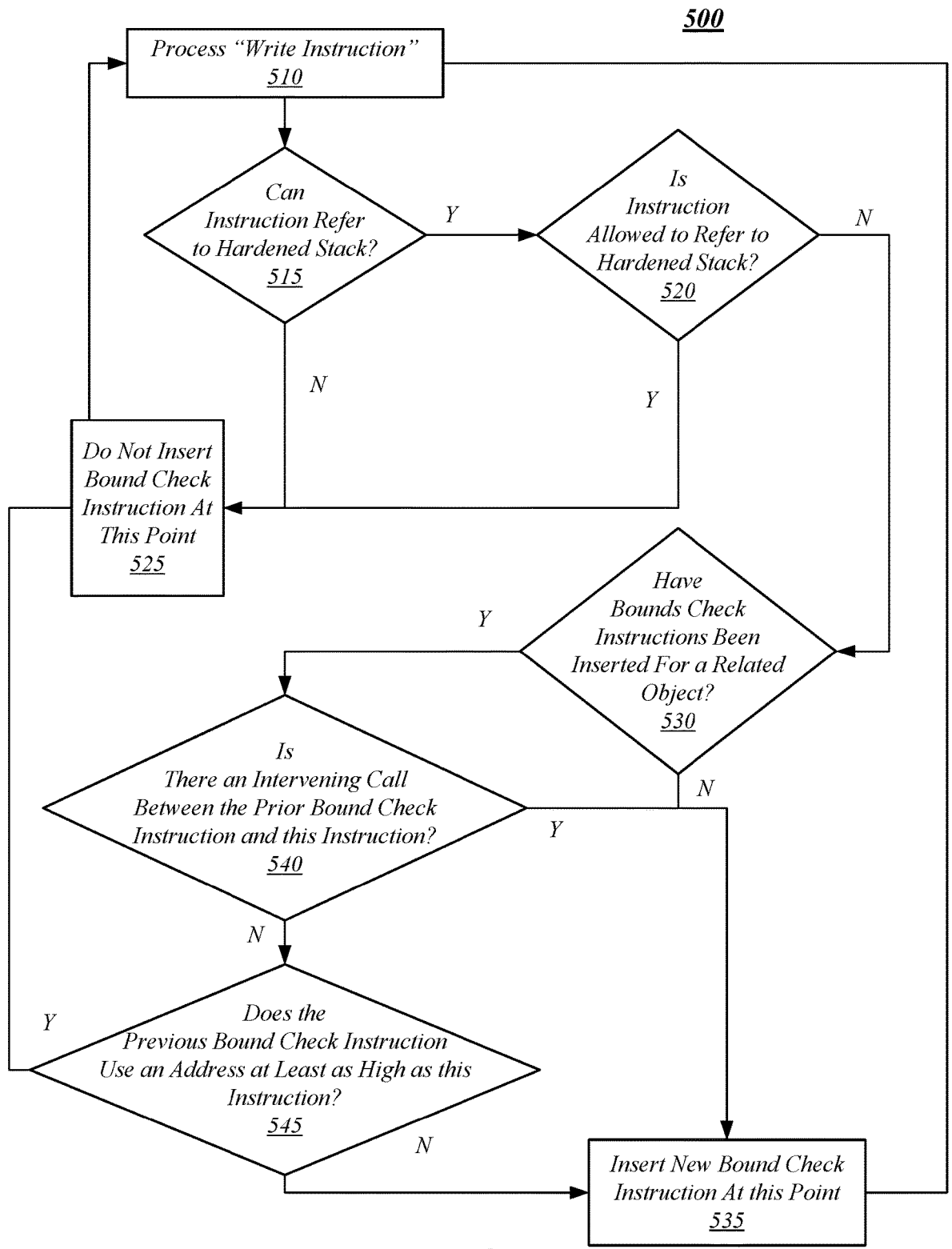
FIG. 5 illustrates an embodiment of a logic flow.

It is noted, that the present disclosure provides several techniques to instrument (e.g., compile and add stack hardening checks to such compiled code) to provide that bounds checks are not needed after each executed instruction. As such, efficiency can be further increased. Such techniques are described below in conjunction with FIGS. 4-5. FIG. 4 depicts a computing device to compile and instrument source code to generate executable code (e.g., code executable by processor 110, or the like) to implement stack hardening techniques as described herein. FIG. 5 depicts a logic flow to instrument source code to provide stack hardening features as described herein.

Turning now to FIG. 4, compiler device 400 is depicted. In general, compiler device 400 is configured to receive source code 401 and generate a compiled executable with a hardened stack 403. For example, compiler device 400 can receive source code 401 and compile such source code to generate one of apps 138 described above. Compiler device 400 comprises a processor 410, which can be like processor 110 of FIG. 1. Additionally, compiler device 400 comprises memory 422, which can be like memory 122 of FIG. 1. Memory 422 can comprise a compiler program 440 that when executed by processor 410 causes processor 410 to generate compiled executable 403 from source code 401. It is to be appreciated, that many conventional compiler programs exist. Compiler program 440 can be like any number of these conventional compiler programs. Furthermore, compiler program 440 can be arranged to generate executable code for any of several different processor architectures, such as, for example, the x86 architecture.

In general, compiler program 440 can instrument or insert bounds check operations into the source code 401 such that executable program 403 provides bounds checking for hardened and unhardened stacks 310 and 320 based on the bound 330 and stack hardening register 116 described above. An illustrative compilation process is depicted in FIG. 5. Accordingly, FIG. 4 is now further described while also referencing FIG. 5.

As noted FIG. 5 depicts a logic flow. Specifically, this figure depicts logic flow 500 to instrument source code to provide stack hardening features. The logic flows, including logic flow 500 and other logic flows described herein are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic flow 500 may be representative of some or all the operations executed by one or more embodiments described herein to instrument source code. For example, logic flow 500 may illustrate operations performed by compiler device 400. Additionally, logic flow 500 may be included in a larger logic flow process to compile source code (e.g., source code 401) to generate executable code (e.g., code 403).

In general, logic flow 500 can be implemented to, for each memory write instruction, determine whether it refers to the hardened stack or not and only compile instructions referring to the hardened stack that need to access the hardened stack and that have been verified to always access the hardened stack safely (i.e. without causing corruption). For any memory write instruction not authorized to access the safe stack or its metadata, the logic flow 500 can insert an instruction prior to the write instruction to compare the highest address accessed by the write instruction to the bound of the unhardened stack (e.g., bound 330, or the like) and generate a fault if the address is outside the bound. This is described in greater detail below. Additionally, it is noted, that numerous alternative or additional embodiments for when and how to insert the bounds check instruction are provided.

Logic flow 500 may begin at block 510. At block 510 "process write instruction" a compiler can process a write instruction. For example, processor 410 of compiler device 400, in executing compiler program 440 can process a write instruction in source code 401. For example, instruction processor 442 of compiler program 440 can process "write_[int, 256]" from source code 401 to generate executable code associated with such a write instruction.

Continuing to decision block 515 "can instruction refer to the hardened stack?" a compiler can determine whether the write instruction (e.g., write instruction processed at block 510, or the like) can refer to the hardened stack. For example, processor 410 of compiler device 400, in executing compiler program 440 can determine whether the processed write instruction can refer to the hardened stack. For example, hardened stack access checker 444 of compiler program 440 can determine whether "write_[int, 256]" from source code 401 can access the hardened stack 310 during execution of compiled code 403.

In some examples, hardened stack access checker 444 can prevent any pointers to the hardened stack from being passed between functions. Said differently, whenever a pointer to a stack allocation is passed between functions, that allocation is placed on the unhardened stack, or not allowed to be placed on the hardened stack. Additionally, hardened stack access checker 444 can implement intraprocedural analysis to track all register values (and associated spill slots) containing pointers to the hardened stack. Such information can then be used to detect memory operands that refer to the hardened stack.

From decision block 515, logic flow 500 can proceed to either block 525 or decision block 520. For example, logic flow 500 can continue from decision block 515 to block 525 based on a determination that the write instruction cannot refer to the hardened stack. Alternatively, logic flow 500 can continue from decision block 515 to decision block 520 based on a determination that the write instruction can refer to the hardened stack.

At decision block 520 "is instruction allowed to refer to the hardened stack?" a compiler can determine whether the write instruction (e.g., write instruction processed at block 510, or the like) is allowed (or permitted) to refer to the hardened stack. For example, processor 410 of compiler device 400, in executing compiler program 440 can determine whether the processed write instruction is permitted to refer to the hardened stack. For example, hardened stack access checker 442 of compiler program 440 can determine whether "write_[int, 256]" from source code 401 is allowed to access the hardened stack 310 during execution of compiled code 403.

From decision block 520, logic flow 500 can proceed to either block 525 or decision block 530. For example, logic flow 500 can continue from decision block 520 to block 525 based on a determination that the write instruction is allowed to refer to the hardened stack. Alternatively, logic flow 500 can continue from decision block 520 to decision block 530 based on a determination that the write instruction is not allowed to refer to the hardened stack.

At decision block 530 "have bound check instruction(s) been inserted for a related object?" a compiler can determine whether bound check instruction(s) been inserted for a related object, or for an object related to write instruction processed at block 510. For example, processor 410 of compiler device 400, in executing compiler program 440 can determine whether bound check instruction(s) been inserted for a related object. For example, related object checker 443 of compiler program 440 can determine whether a bound check instruction 215 has been inserted into executable code 403 for an object related to "write [int, 256]" from source code 401.

For example, multiple accesses to the same or different portions of a single object are commonly found in a single basic block of source code. As such, compiler program 440 can reduce overhead by optimizing out redundant bound check instructions. Said differently, compiler 440 need only retain the bound check instructions against the highest address that can possibly be accessed by the related write instructions to that object. It is noted, compiler 440 should carefully place the bound check instruction to account for corner cases that could result in inadequate bounds checking. For example, consider a single basic block that contains multiple accesses to some object not on the hardened stack that are wrapped around an invocation to pthread_create. The upper limit of bound 330 may be lowered when a new hardened stack 310 is allocated for the new thread 232 invoked by the thread create instruction. As such, if just a single bound check instruction were placed prior to the invocation of pthread_create, then accesses after pthread_create could corrupt the new hardened stack without being detected. Accordingly, some examples, will place bound check instructions prior to the stores being checked, and to perform fresh checks of accesses following calls.

From decision block 530, logic flow 500 can proceed to either block 535 or decision block 540. For example, logic flow 500 can continue from decision block 530 to block 535 based on a determination that a bound check instruction has not been inserted for a related object. Alternatively, logic flow 500 can continue from decision block 530 to decision block 540 based on a determination that a bound check instruction has been inserted for a related object.

At decision block 540 "is there an intervening call between the prior bound check instruction and this write instruction?" a compiler can determine whether there is an intervening call between the prior bound check instruction and this write instruction. For example, processor 410 of compiler device 400, in executing compiler program 440 can determine whether there is an intervening call between the prior bound check instruction and this write instruction. As another example, intervening call checker 444 of compiler program 440 can determine whether there is an intervening call between "write_[int, 256]" from source code 401 and the previously inserted bounds check instruction 215. However, in some embodiments, the contents of the stack hardening register remain constant during the entire runtime of the program. In such an example, fresh bounds checks may not be inserted after the call instructions.

From decision block 540, logic flow 500 can proceed to either block 535 or decision block 545. For example, logic flow 500 can continue from decision block 540 to block 535 based on a determination that there is an intervening call between the write instruction and the previously inserted bound check instruction. Alternatively, logic flow 500 can continue from decision block 540 to decision block 545 based on a determination that there is not an intervening call between the write instruction and the previously inserted bound check instruction.

At decision block 545 "does the previous bound check instruction use an address at least as high as this instruction?" a compiler can determine whether the previous bound check instruction uses an address at least as high as the address referenced in this write instruction. For example, processor 410 of compiler device 400, in executing compiler program 440 can determine whether the previous bound check instruction uses an address at least as high as the address referenced in this write instruction. As another example, example, address checker 445 of compiler program 440 can whether determine whether the previous bound check instruction 215 uses an address at least as high as the address used by "write_[int, 256]" from source code 401.

From decision block 545, logic flow 500 can proceed to either block 525 or block 535. For example, logic flow 500 can continue from decision block 545 to block 525 based on a determination that the previous bound check instruction does use an address at least as high as the address referenced in this write instruction. Alternatively, logic flow 500 can continue from decision block 545 to block 535 based on a determination that the previous bound check instruction does not use an address at least as high as the address referenced in this write instruction.

At block 525 "do not insert a bound check instruction at this point" a compiler can determine whether the previous bound check instruction uses an address at least as high as the address referenced in this write instruction. For example, processor 410 of compiler device 400, in executing compiler program 440 may not insert a bound check instruction 215 at this point. Logic flow 500, from block 525 can return to block 510 and process another write instruction.

At block 535 "insert new bound check instruction at this point" a compiler can insert a bound check instruction at this point. For example, processor 410 of compiler device 400, in executing compiler program 440 can insert a bound check instruction 215 into compiled code 403. For example, bound check instruction inserter 446 of compiler program 440 can insert a bound check instruction 215 prior to "write [int, 256]" from source code 401 to generate executable code 403 with a bound check instruction to harden the stack 300 against ROP attacks as described herein. Alternatively, if a bounds check for a related memory access occurred earlier in the basic block without intervening unacceptable program constructs (e.g. calls that may cause the stack hardening register(s) limit(s) to be modified), but that bounds check does not specify an address at least as high as the highest address accessed by the instruction whose access is being checked, then the address checked by the earlier instruction may be adjusted upwards to satisfy that criteria. Such a process may avoid the need to insert an additional bounds check instruction.

In some embodiments, apps (e.g., apps 138, or the like) arranged to implement stack 300 including hardened stack 310 and unhardened stack 320 can interoperate with apps not instrumented to provide a hardened stack as detailed herein. For example, compiled executable instrumented with hardened stack 310 could interoperate with (e.g., call, be called by, or the like) uninstrumented applications. In some examples, when uninstrumented applications call instrumented applications without passing any pointers to stack allocations, then the instrumented applications will operate as intended to mitigate ROP attacks. Thus, interoperability may be supported in such cases that satisfy this condition. Another challenge is related to setjmp/longjmp and exception handling. In instrumented applications, these constructs should be extended to save and restore pointers to the unhardened stack 320, which may not be the case for conventional code.

Some embodiments can support interoperability by nullifying the stack hardening register 116 to cover the entire address space. For example, the stack hardening register 116 could be updated to cover both bound 330 as well as the address space corresponding to the hardened stack 310 when jumping from uninstrumented to instrumented code and re-enabling restrictive bounds after the uninstrumented code returns. In this manner, if the uninstrumented code invokes instrumented code and passes stack pointers to the instrumented code, the bounds checks will not fail. One way to implement this is to leave the BNDPRESERVE setting disabled, so that the first jump or call within uninstrumented code clears register 116. In that configuration, instrumented code would apply the BND prefix to calls, returns, and jumps to preserve the contents of register 116. The instrumented code may also include bounds set instructions at locations in the program that will be executed at the time or soon after the time that uninstrumented code returns control to the instrumented code, so that the bounds set instructions can restore the appropriate bounds to register 116.

In some examples, processor 110 can include instructions in instruction set 210 to reset bound 330 after all stack frames for uninstrumented functions have been cleared from the stack 300. The processor 110 could be extended with a per-thread register (e.g., another stack hardening register 116, a BNDDISSP register, or the like) to capture the current stack pointer at the time that the first branch is executed that causes the registers 116 to be cleared. As another example, instead of clearing the registers 116, the processor 110 could be configured to not implement bounds check instruction 215 after such a branch. Then, the next time that a return instruction is executed that sets the stack pointer to a value equal to or greater than the current value of bound 330, it would re-enable bounds checking.

In some examples, the stack hardening register 116 or an associated configuration register could include an indication (e.g., a bit, or the like) to indicate whether bounds checking is currently enabled or disabled. The instrumented code could be arranged to set and/or disable this bit when calling/returning from uninstrumented applications, e.g. with explicit instructions or implicitly in conjunction with a BNDDISSP register and instruction prefixes, or the like. In some examples, ones of the stack hardening registers could be arranged to store indications of pointers to the unhardened stack 320.

Figure 6:
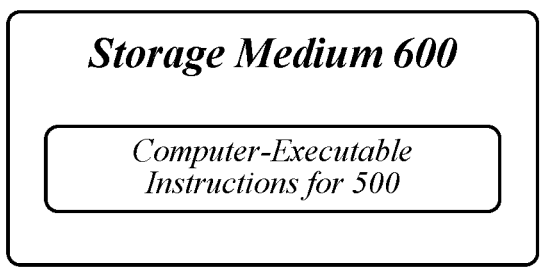
FIG. 6 illustrates an example of a storage medium.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
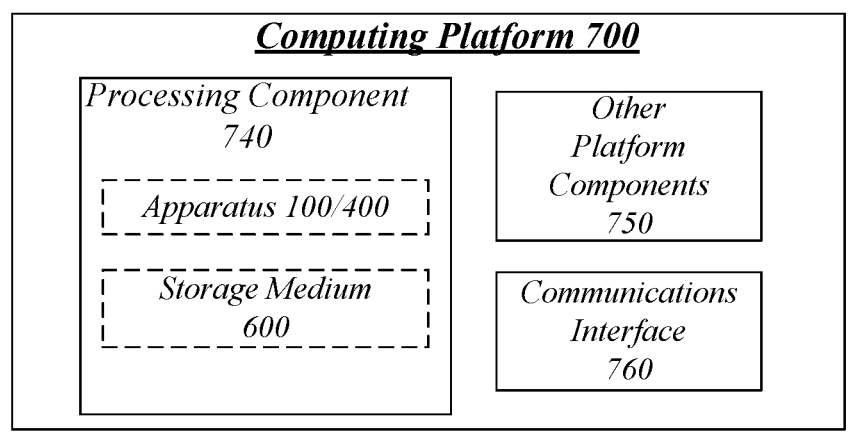
FIG. 7 illustrates an example computing platform.

FIG. 7 illustrates an example computing platform 700. In some examples, as shown in FIG. 7, computing platform 700 may include a processing component 740, other platform components or a communications interface 760. According to some examples, computing platform 700 may be implemented in a computing device such as a server in a system such as a data center. Embodiments are not limited in this context.

According to some examples, processing component 740 may execute processing operations or logic for apparatus 100/400 and/or storage medium 600. Processing 740 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 750 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 760 may include logic and/or features to support a communication interface. For these examples, communications interface 760 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 700 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 700 described herein, may be included or omitted in various embodiments of computing platform 700, as suitably desired.

The components and features of computing platform 700 may be implemented using any combination of discrete circuitry, ASICs, logic gates and/or single chip architectures. Further, the features of computing platform 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1400 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

A computing device to harden an execution stack, comprising: a processor, the processor comprising a processing core and a first register; and a memory coupled to the processor, the memory storing instructions that when executed cause the processor to: compare a highest memory address accessed by a write instruction to a memory address bounds defined in the first register; generate a fault based on the comparison.

Example 2

The computing device of example 1, comprising the memory storing instructions that when executed cause the processor to compare the highest memory address accessed by the write instruction to a memory address bounds defined in a second register of the processor.

Example 3

The computing device of example 1, comprising the memory storing instructions that when executed cause the processor to: determine whether a memory address accessed by the write instruction is outside the memory address bounds defined in the first register; and generate the fault based on a determination that the memory address accessed by the write instruction is outside the memory address bounds defined in the first register.

Example 4

The computing device of example 1, comprising the memory storing instructions that when executed cause the processor to: compare a lowest memory address accessed by the write instruction to the memory address bounds defined in the first register; and generate the fault based on the comparison of the lower memory address accessed by the write instruction.

Example 5

The computing device of example 4, comprising the memory storing instructions that when executed cause the processor to determine the lowest memory address and the highest memory address from a single memory operand.

Example 6

The computing device of example 1, the first register comprising an MPX register.

Example 7

The computing device of example 6, the first register to store linear memory addresses.

Example 8

The computing device of example 7, comprising the memory storing instructions that when executed cause the processor to translate the highest memory address from an effective memory address to a linear memory address.

Example 9

The computing device of example 1, the instructions to cause the processor to generate the fault based on a determination that the highest memory address accessed by the write instruction exceeds the memory address bounds.

Example 10

The computing device of example 9, the memory address bounds to define a memory address above which a hardened portion of a control flow stack is stored and below which an unhardened portion of the control flow stack is stored.

Example 11

The computing device of example 10, the hardened portion of the control flow stack to comprise indications of return addresses.

Example 12

A method to harden an execution stack, comprising: comparing, by a processor of a computing device, a highest memory address accessed by a write instruction to a memory address bounds defined in a first register of the processor; and generating a fault based on the comparison.

Example 13

The method of example 12, comprising comparing the highest memory address accessed by the write instruction to a memory address bounds defined in a second register of the processor.

Example 14

The method of example 12, comprising: determining whether a memory address accessed by the write instruction is outside the memory address bounds defined in the first register; and generating the fault based on a determination that the memory address accessed by the write instruction is outside the memory address bounds defined in the first register.

Example 15

The method of example 12, comprising: comparing a lowest memory address accessed by the write instruction to the memory address bounds defined in the first register; and generating the fault based on the comparison of the lower memory address accessed by the write instruction.

Example 16

The method of example 15, comprising determining the lowest memory address and the highest memory address from a single memory operand.

Example 17

The method of example 12, the first register comprising an MPX register.

Example 18

The method of example 17, the first register to store linear memory addresses.

Example 19

The method of example 18, comprising translating the highest memory address from an effective memory address to a linear memory address.

Example 20

The method of example 12, comprising generating the fault based on a determination that the highest memory address accessed by the write instruction exceeds the memory address bounds.

Example 21

The method of example 20, the memory address bounds to define a memory address above which a hardened portion of a control flow stack is stored and below which an unhardened portion of the control flow stack is stored.

Example 22

The method of example 21, the hardened portion of the control flow stack to comprise indications of return addresses.

Example 23

The method of example 12, comprising: storing, to a second register of the processor, a stack pointer value, the stack pointer value to indicate a boundary between stack frames of instrumented code above the boundary and uninstrumented code below the boundary; determining whether the stack pointer rises to the stack pointer value; and enabling bounds checking based on a determination that the stack pointer rises to the stack pointer value.

Example 24

An apparatus for a device having a hardened safe stack, the apparatus comprising means for performing the method of any one of examples 12 to 23.

Example 25

A computer-readable storage medium that stores instructions for execution by a processor of a compiler device, the instructions to cause the processor to: compare a highest memory address accessed by a write instruction to a memory address bounds defined in a first register of the processor; and generate a fault based on the comparison.

Example 26

The computer-readable storage medium of example 25, the instructions to cause the processor to compare the highest memory address accessed by the write instruction to a memory address bounds defined in a second register of the processor.

Example 27

The computer-readable storage medium of example 25, the instructions to cause the processor to: determine whether a memory address accessed by the write instruction is outside the memory address bounds defined in the first register; and generate the fault based on a determination that the memory address accessed by the write instruction is outside the memory address bounds defined in the first register.

Example 28

The computer-readable storage medium of example 25, the instructions to cause the processor to: compare a lowest memory address accessed by the write instruction to the memory address bounds defined in the first register; and generate the fault based on the comparison of the lower memory address accessed by the write instruction.

Example 29

The computer-readable storage medium of example 28, the instructions to cause the processor to determine the lowest memory address and the highest memory address from a single memory operand.

Example 30

The computer-readable storage medium of example 25, the first register comprising an MPX register.

Example 31

The computer-readable storage medium of example 30, the first register to store linear memory addresses.

Example 32

The computer-readable storage medium of example 31, the instructions to cause the processor to translate the highest memory address from an effective memory address to a linear memory address.

Example 33

The computer-readable storage medium of example 25, the instructions to cause the processor to generate the fault based on a determination that the highest memory address accessed by the write instruction exceeds the memory address bounds.

Example 34

The computer-readable storage medium of example 33, the memory address bounds to define a memory address above which a hardened portion of a control flow stack is stored and below which an unhardened portion of the control flow stack is stored.

Example 35

The computer-readable storage medium of example 34, the hardened portion of the control flow stack to comprise indications of return addresses.

Example 36

A method to harden an execution stack, comprising: identifying, on a computing device, a write instruction, the write instruction to include an indication to write data to a memory; determining whether the write instruction can refer to a hardened stack of a control flow stack; not inserting a bounds check instruction before the write instruction based on a determination that the write instruction cannot refer to the hardened stack.

Example 37

The method of example 36, comprising: determining whether the instruction is allowed to refer to the hardened stack; and not inserting a bounds check instruction before the write instruction based on a determination that the write instruction is allowed to refer to the hardened stack and based on a determination that the write instruction can refer to the hardened stack.

Example 38

The method of example 37, comprising: determining whether a prior bounds check instruction has been inserted for an object related to the write instruction; and inserting a bounds check instruction before the write instruction based on a determination that a prior bounds check instruction has not been inserted for a related object and not based on a determination that the write instruction is not allowed to refer to the hardened stack.

Example 39

The method of example 38, comprising: determining whether there is an intervening call between the prior bounds check instruction and the write instruction; and inserting a bounds check instruction before the write instruction based on a determination that there is an intervening call between the prior bounds check instruction and the write instruction.

Example 40

The method of example 39, comprising: determining whether the prior bounds check instruction uses a memory address at least as high as the write instruction; and inserting a bounds check instruction before the write instruction based on a determination that the prior bounds check instruction does not use a memory address at least as high as the write instruction.

Example 41

The method of example 38, the bounds check instruction to determine whether the write instruction accesses memory outside a bounds of memory addresses.

Example 42

The method of claim 40, the bounds of memory addresses indicated in a register.

Example 43

The method of example 42, the register an MPX register of a processing unit.

Example 44

An apparatus for a device having a hardened safe stack, the apparatus comprising means for performing the method of any one of examples 36 to 43.

Example 45

A computer-readable storage medium that stores instructions for execution by a processor of a compiler device, the instructions to cause the processor to: identify, on a compiler device, a write instruction, the write instruction to include an indication to write data to a memory; determine whether the write instruction can refer to a hardened stack of a control flow stack; not insert a bounds check instruction before the write instruction based on a determination that the write instruction cannot refer to the hardened stack.

Example 46

The computer-readable storage medium of example 45, the instructions to cause the processor to: determine whether the instruction is allowed to refer to the hardened stack; and not insert a bounds check instruction before the write instruction based on a determination that the write instruction is allowed to refer to the hardened stack and based on a determination that the write instruction can refer to the hardened stack.

Example 47

The computer-readable storage medium of example 46, the instructions to cause the processor to: determine whether a prior bounds check instruction has been inserted for an object related to the write instruction; and insert a bounds check instruction before the write instruction based on a determination that a prior bounds check instruction has not been inserted for a related object and not based on a determination that the write instruction is not allowed to refer to the hardened stack.

Example 48

The computer-readable storage medium of example 46, the instructions to cause the processor to: determine whether there is an intervening call between the prior bounds check instruction and the write instruction; and insert a bounds check instruction before the write instruction based on a determination that there is an intervening call between the prior bounds check instruction and the write instruction.

Example 49

The computer-readable storage medium of example 48, the instructions to cause the processor to: determine whether the prior bounds check instruction uses a memory address at least as high as the write instruction; and insert a bounds check instruction before the write instruction based on a determination that the prior bounds check instruction does not use a memory address at least as high as the write instruction.

Example 50

The computer-readable storage medium of example 47, the bounds check instruction to determine whether the write instruction accesses memory outside a bounds of memory addresses.

Example 51

The computer-readable storage medium of example 50, the bounds of memory addresses indicated in a register.

Example 52

The computer-readable storage medium of example 51, the register an MPX register of a processing unit.

What is claimed is:

1. A computing device to harden an execution stack, comprising:
   a processor, the processor comprising a processing core and a first register; and
   memory coupled to the processor, the memory storing instructions that when executed cause the processor to:
      determine whether a memory address accessed by a write instruction is outside a memory address bounds defined in the first register;
      generate a fault based on a determination that the memory address accessed by the write instruction is outside the memory address bounds defined in the first register;
      store, to a second register of the processor, a stack pointer value, the stack pointer value to indicate a boundary between stack frames of instrumented code above the boundary and uninstrumented code below the boundary;
      determine whether the stack pointer rises to the stack pointer value; and
      enable bounds checking based on a determination that the stack pointer rises to the stack pointer value.

2. The computing device of claim 1, comprising the memory storing instructions that when executed cause the processor to compare a highest memory address accessed by the write instruction to a memory address bounds defined in a second register of the processor.

3. The computing device of claim 1, comprising the memory storing instructions that when executed cause the processor to:
   compare a lowest memory address accessed by the write instruction to the memory address bounds defined in the first register; and
   generate the fault based on the comparison of the lower memory address accessed by the write instruction.

4. The computing device of claim 3, comprising the memory storing instructions that when executed cause the processor to determine the lowest memory address and a highest memory address from a single memory operand.

5. The computing device of claim 1, the first register comprising an MPX register.

6. The computing device of claim 5, the first register to store linear memory addresses.

7. The computing device of claim 6, comprising the memory storing instructions that when executed cause the processor to translate a highest memory address from an effective memory address to a linear memory address.

8. The computing device of claim 1, the instructions to cause the processor to generate the fault based on a determination that a highest memory address accessed by the write instruction exceeds the memory address bounds.

9. The computing device of claim 8, the memory address bounds to define a memory address above which a hardened portion of a control flow stack is stored and below which an unhardened portion of the control flow stack is stored.

10. The computing device of claim 9, the hardened portion of the control flow stack to comprise indications of return addresses.

11. A method to harden an execution stack, comprising:
   determining, by a processor of a computing device, whether a memory address accessed by a write instruction is outside a memory address bounds defined in a first register of the processor;
   generating a fault based on a determination that the memory address accessed by the write instruction is outside the memory address bounds defined in the first register;
   storing, to a second register of the processor, a stack pointer value, the stack pointer value to indicate a boundary between stack frames of instrumented code above the boundary and uninstrumented code below the boundary;
   determining whether the stack pointer rises to the stack pointer value; and
   enabling bounds checking based on a determination that the stack pointer rises to the stack pointer value.

12. The method of claim 11, comprising comparing a highest memory address accessed by the write instruction to a memory address bounds defined in a second register of the processor.

13. The method of claim 11, comprising:
comparing a lowest memory address accessed by the write instruction to the memory address bounds defined in the first register; and
generating the fault based on the comparison of the lower memory address accessed by the write instruction.

14. The method of claim 13, comprising determining the lowest memory address and a highest memory address from a single memory operand.

15. The method of claim 11, the first register comprising an MPX register.

16. The method of claim 15, the first register to store linear memory addresses.

17. The method of claim 16, comprising translating a highest memory address from an effective memory address to a linear memory address.

18. The method of claim 11, comprising generating the fault based on a determination that a highest memory address accessed by the write instruction exceeds the memory address bounds.

19. The method of claim 18, the memory address bounds to define a memory address above which a hardened portion of a control flow stack is stored and below which an unhardened portion of the control flow stack is stored, the hardened portion of the control flow stack to comprise indications of return addresses.

20. A non-transitory computer-readable storage medium that stores instructions for execution by a processor, the instructions to cause the processor to:
determine whether a memory address accessed by a write instruction is outside a memory address bounds defined in a first register of the processor;
generate a fault based on a determination that the memory address accessed by the write instruction is outside the memory address bounds defined in the first register;
store, to a second register of the processor, a stack pointer value, the stack pointer value to indicate a boundary between stack frames of instrumented code above the boundary and uninstrumented code below the boundary;
determine whether the stack pointer rises to the stack pointer value; and
enable bounds checking based on a determination that the stack pointer rises to the stack pointer value.

21. The non-transitory computer-readable storage medium of claim 20, the instructions to cause the processor to compare a highest memory address accessed by the write instruction to a memory address bounds defined in a second register of the processor.

22. The non-transitory computer-readable storage medium of claim 20, the memory address bounds to define a memory address above which a hardened portion of a control flow stack is stored and below which an unhardened portion of the control flow stack is stored.

23. The non-transitory computer-readable storage medium of claim 22, the hardened portion of the control flow stack to comprise indications of return addresses.

24. The non-transitory computer-readable storage medium of claim 20, wherein the first register to store linear memory addresses.

25. The non-transitory computer-readable storage medium of claim 24, the instructions to cause the processor to:
translate a highest memory address from an effective memory address to a linear memory address; and
generate the fault based on a determination that the highest memory address accessed by the write instruction exceeds the memory address bounds.

* * * * *